United States Patent
Gros-D'Aillon et al.

(10) Patent No.: US 9,903,351 B2
(45) Date of Patent: Feb. 27, 2018

(54) PISTON-TYPE TRANSFER PUMP DEVICE, METHOD FOR TRANSFERRING PARTICULATE SOLID MATTER USING SUCH A DEVICE, APPLICATION OF THE METHOD TO THE FEEDING OF A GASIFICATION REACTOR

(75) Inventors: Luc-Francois Gros-D'Aillon, Les Bourins (FR); Thierry Chataing, Lans en Vercors (FR); Sylvie Rouge, Brie et Angonnes (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 986 days.

(21) Appl. No.: 14/006,205

(22) PCT Filed: Mar. 21, 2012

(86) PCT No.: PCT/EP2012/054984
§ 371 (c)(1),
(2), (4) Date: Sep. 19, 2013

(87) PCT Pub. No.: WO2012/126939
PCT Pub. Date: Sep. 27, 2012

(65) Prior Publication Data
US 2014/0003968 A1   Jan. 2, 2014

(30) Foreign Application Priority Data
Mar. 22, 2011   (FR) ..................... 11 52361

(51) Int. Cl.
*F04B 3/00* (2006.01)
*F04B 1/00* (2006.01)
(Continued)

(52) U.S. Cl.
CPC .............. *F04B 1/00* (2013.01); *C10J 3/30* (2013.01); *C10J 3/503* (2013.01); *F04B 7/045* (2013.01);
(Continued)

(58) Field of Classification Search
CPC .......... F04B 3/00; F04B 7/045; F04B 15/023; F04B 15/02
(Continued)

(56) References Cited

U.S. PATENT DOCUMENTS 1,274,884 A * 8/1918 Hudson ............... F04B 3/00
417/488
1,689,419 A * 10/1928 Bronander ........... F04B 3/00
123/51 AA
(Continued)

FOREIGN PATENT DOCUMENTS

FR      782 769      6/1935
FR    2 564 525     11/1985
(Continued)

OTHER PUBLICATIONS

French Preliminary Search Report dated Feb. 16, 2012 in Patent Application No. 1152361 with English translation of categories of documents.
(Continued)

*Primary Examiner* — Charles Freay
*Assistant Examiner* — Christopher Bobish
(74) *Attorney, Agent, or Firm* — Oblon, McClelland, Maier & Neustadt, L.L.P.

(57) ABSTRACT

A device for transfer of granular solid material between two chambers at different pressures. A piston type transfer pump device used in a horizontal position transfers granular material into the compression chamber by gravity and evacuates the material into the exhaust chamber at a higher pressure. Such a device may for example find an application for feeding a gasification reactor with biomass.

25 Claims, 4 Drawing Sheets

(51) Int. Cl.
  *F04B 15/02* (2006.01)
  *C10J 3/30* (2006.01)
  *F04B 7/04* (2006.01)
  *C10J 3/50* (2006.01)

(52) U.S. Cl.
  CPC ............ *F04B 15/02* (2013.01); *F04B 15/023* (2013.01); *C10J 2200/154* (2013.01); *C10J 2300/0916* (2013.01); *Y02P 20/129* (2015.11); *Y02P 20/145* (2015.11)

(58) Field of Classification Search
  USPC .................................................. 417/487, 488
  See application file for complete search history.

(56) References Cited

U.S. PATENT DOCUMENTS

| | | | |
|---|---|---|---|
| 2,169,807 A | 8/1939 | Lyon et al. | |
| 2,261,471 A | 11/1941 | Hull | |
| 2,673,519 A * | 3/1954 | Halliburton | F04B 3/00 417/464 |
| 2,705,835 A | 4/1955 | Massmann | |
| 2,833,226 A * | 5/1958 | De Laage De Meux | F04B 3/00 91/181 |
| 3,464,359 A | 9/1969 | King et al. | |
| 3,649,204 A * | 3/1972 | Farr | G01N 35/00 422/50 |
| 3,695,788 A | 10/1972 | Loomans | |
| 4,150,759 A | 4/1979 | Bell, Jr. | |
| 4,416,596 A | 11/1983 | Lichtenstein | |
| 5,639,220 A * | 6/1997 | Hayakawa | F04B 7/045 347/30 |
| 6,004,117 A * | 12/1999 | Brunk | F04B 13/00 417/488 |
| 9,194,383 B2 * | 11/2015 | Knobel | F04B 15/02 |
| 2003/0102179 A1 * | 6/2003 | Achten | F02B 71/045 180/306 |
| 2005/0284427 A1 * | 12/2005 | Barth | F02B 71/04 123/46 R |
| 2008/0118376 A1 | 5/2008 | Verrilli | |
| 2014/0305033 A1 | 10/2014 | Chataing | |

FOREIGN PATENT DOCUMENTS

| | | |
|---|---|---|
| FR | 2 644 521 | 9/1990 |
| GB | 1 508 665 | 4/1978 |

OTHER PUBLICATIONS

International Search Report dated Aug. 16, 2012 in PCT/EP12/54984 filed Mar. 21, 2012.

* cited by examiner

PISTON-TYPE TRANSFER PUMP DEVICE, METHOD FOR TRANSFERRING PARTICULATE SOLID MATTER USING SUCH A DEVICE, APPLICATION OF THE METHOD TO THE FEEDING OF A GASIFICATION REACTOR

TECHNICAL FIELD

The invention relates to a new piston type transfer pump device.

It is more particularly applicable to a method for transferring solid granular material using this new device between two chambers at different pressures. Note that in the context of the invention, it can be understood that the term "granular" refers to the fact that the solid material to be transferred is in the form of particles or grains with variable or constant size grading and submillimetric, millimetric or centrimetric dimensions and that may be more or less mixed with a liquid.

The target preferred application is biomass feed to a gasification reactor.

PRIOR ART

One of the meanings of the term "biomass" is any non-homogeneous material with biological origin that may be practically dry such as sawdust or straw residues, or may be saturated with water such as household waste. Its variable size grading makes it difficult to transport. Considering the fact that biomass is being reused more frequently or its reuse is sometimes even imposed, for example by thermo-chemical conversion, transport of this solid material is becoming more widespread and must satisfy demanding criteria such as no losses, at optimum cost. Solid biomass particles are powder or chips, for example cellulose particles such as thin vegetable chips like wood chips. Many systems exist for transporting or conveying solid materials, and for biomass, including conveyors, typically worm screw systems, pneumatic transfer systems or rotary lock systems. But all these systems have been developed to be able to operate at pressures equal to approximately atmospheric pressure, or in other words at low pressure differences between zones upstream and downstream from the conveyor or transport system.

During the reuse process, for example thermo-chemical conversion, it is necessary to be able to start from biomass with different natures and size grading normally stored at atmospheric pressure, to be able to continuously supply a fluidised bed type of chemical reactor (gasification reactor) or an entrained flow reactor operating under pressure.

At the moment, there is practically only one type of device called a Lock hopper designed to operate under transfer conditions between an upstream chamber at atmospheric pressure and a downstream chamber at high pressure. A lock hopper device uses one or several intermediate pressurised transfer chambers, for example pressurised with nitrogen, or airlocks.

More precisely, operation of such a lock hopper device may be described as follows. A transfer chamber is used comprising an upstream valve for inserting a volume of solid particles, and a downstream valve for discharging solid particles into the feed chamber of the equipment considered (chemical reactor). Operation is cyclic and each cycle can be summarised in the following steps:

introduction of a volume of solid particles into the transfer chamber, usually by gravity by opening the upstream valve while keeping the downstream valve closed;

close the upstream valve, the downstream valve being kept closed;

pressurization in the volume defined by the transfer chamber, until the pressure in the transfer chamber reaches the pressure in the feed chamber of the chemical reactor;

open the downstream valve, which enables the transfer of solid particles into the feed chamber, usually by gravity flow close the downstream valve, the upstream valve being kept closed, and evacuate the surplus pressure present in the transfer chamber, the evacuated gas sometimes being stored for reuse.

The main disadvantages of a lock hopper device can be summarised as follows:

discontinuous operation:

necessarily good synchronisation of valve control;

during manipulation of material with variable size grading, possible damage to the operation of the valves (blockage, incomplete closure by said material);

high energy consumption because each cycle requires compression and expansion of gas, in other words very high consumption of the pressurisation gas with values conventionally of the order of about one tenth of the transported mass flow;

high investment;

large size and, possible pollution downstream from the cycle.

U.S. Pat. No. 4,150,759, discloses a device for feeding coal 9 into a gasification reactor composed of a so-called floating piston 27 maintaining a space between the two inlet pistons 21, 23 through a rod 25, the inlet pistons sliding in a tubular sleeve 11 and each alternately exposing an inlet hopper 15, 17 for coal 9. There are many disadvantages of the device according to this patent, and they can be summarised as follows:

the pressure difference between the transfer chamber A, B in which coal 9 is present and the gasification reactor feed line 10 is sudden, which can hinder the particle flow in the line 10. It can be considered that this sudden pressure change is even capable of moving particles in the direction opposite the feed orifice 13 (discharge), in other words to the inside upper surface of the sleeve 11;

such a device cannot really be used to transfer a solid material in the form of particles that can form lumps, such as wood fibres; it is quite possible that such particles would agglomerate around the central rod 25 that maintains the space between the inlet pistons 21, 23 and accumulate at the interface between the floating piston 27 and the sleeve 11. Sliding of the floating piston 27 would thus be seriously hindered by these particle agglomerations/accumulations.

the sleeve 11 acts as the actuator chamber of the pistons 21, 23. Firstly, this fixes the operating pressure of the pistons, and secondly it wets the inside wall of the sleeve by the hydraulic actuation liquid, which is a source of pollution of the particles to be transferred.

In other words, the transfer device for coal 9 according to this document U.S. Pat. No. 4,150,759 does not seem to be reliable and it cannot really be envisaged for transferring a solid material in the form of particles that might agglomerate, such as biomass.

Therefore the general purpose of the invention is to propose a new solution for the transfer of granular solid material between two chambers at different pressures, which does not have the disadvantages of devices according to prior art.

One purpose of the invention is to propose a device for the transfer of solid granular material between two chambers at different pressures, that is simple in operation, efficient and has the lowest possible energy consumption.

Another purpose of the invention is to disclose a transfer device like that above that requires low investment, and that is compact and has low pollution downstream from its operating cycle.

PRESENTATION OF THE INVENTION

To achieve this, the subject-matter of the invention is a piston transfer pump device comprising:

a tubular sleeve comprising a first orifice called the inlet orifice in fluid communication with a first chamber called the inlet chamber and a second orifice called the exhaust orifice, in fluid communication with a second chamber called the exhaust chamber, that can be pressurised at a greater pressure than the pressure in the inlet chamber; the inlet orifice and the exhaust orifice being offset longitudinally along the axis of the tubular sleeve, delimiting a third chamber called the compression chamber between them;

a first piston called the inlet piston, capable of sliding in the tubular sleeve between an extreme open position in which it at least partially exposes the inlet orifice in the sleeve and an extreme closed position in which it closes off the inlet orifice while at least partially leaving the exhaust orifice exposed;

a second piston called the exhaust piston, capable of sliding in the tubular sleeve between an extreme closed position in which it closes off the exhaust orifice while leaving the inlet orifice exposed and an extreme open position in which it at least partially exposes the exhaust orifice.

The inlet piston and the exhaust piston are mechanically independent and each is provided with piston rings at their periphery, that can be brought into contact with the internal surface of the sleeve as the pistons slide.

The exhaust piston can be held in its extreme position closing the exhaust orifice until the inlet piston reaches a first intermediate closed position in which it closes off the inlet orifice and jointly with the inlet piston, delimits a volume of the compression chamber such that the gas pressure inside it is at least equal to the gas pressure in the exhaust chamber, sliding of the exhaust piston from its extreme closed position to its open position allowing compressed gas to enter the exhaust chamber.

Advantageously, the inlet orifice and the exhaust orifice are diametrically opposite each other on opposite sides of the axis of the tubular sleeve.

The tubular sleeve can advantageously comprise a third orifice, said to be the balancing orifice, diametrically opposite the exhaust orifice and also in fluid communication with the exhaust chamber.

The first intermediate closed position of the inlet piston is preferably such that the pressure in the compression chamber is approximately equal to the pressure in the exhaust chamber.

Advantageously, the exhaust piston slides under the action of the gas itself compressed as it passes from the compression chamber into the exhaust chamber. Thus, it is advantageous if means are provided to recover energy supplied by the exhaust piston sliding from its extreme closed position to its extreme open position.

The inlet piston is preferably capable of being in a second intermediate position when the exhaust piston slides from its open position to its extreme closed position and in which sliding of the inlet piston from its second intermediate position to its extreme open position is actuated by the compressed gas in the compression chamber. Once again, it would be advantageous if means are provided to recover energy supplied by the inlet piston sliding from its second intermediate closed position to its extreme open position.

The energy recovery means may be composed of a connecting rod-crank system or gas pressure accumulators.

The device according to the invention may preferably include:

a first hopper called the inlet hopper to create fluid communication between the inlet chamber and the inlet orifice;

a second hopper called the exhaust hopper to create fluid communication between the exhaust chamber and the exhaust orifice.

Preferably, the inlet hopper and the exhaust hopper each forms a tubing that can be fitted around the tubular sleeve.

The exhaust tubing advantageously delimits a fourth chamber on the inside called the balancing chamber, in fluid communication with the balancing orifice when it is fitted around the tubular sleeve.

Preferably, the piston rings are arranged around the periphery at the end of the pistons, more precisely close to the corresponding surfaces of the pistons called the compression surfaces, delimiting said compression chamber.

The first chamber of one of the previous devices may be connected or fed through a feed device comprising a rotary lock connected to said first chamber.

The invention also relates to a method for transferring solid granular material between two chambers at different pressures using a device described above, by which the sleeve is in an approximately horizontal position with the inlet orifice and the exhaust orifice in the upper part and the lower part respectively of the sleeve, and in which the following steps are carried out:

a/bring the inlet piston in its extreme open position such that solid granular material can flow by gravity into the compression chamber and bring the exhaust piston into its extreme closed position;

b/move the inlet piston into its extreme closed position of the inlet orifice and hold the exhaust piston in its extreme closed position so as to move the granular solid material horizontally and compress the gas present in the compression chamber;

c/when the inlet piston has reached its first intermediate closed position, move the exhaust piston to its extreme open position until communication is created between the compression chamber and the exhaust orifice;

d/move the inlet piston as far as its extreme closed position so as to make granular solid material flow by gravity from the compression chamber through the exhaust orifice.

The pressure in the inlet chamber is preferably approximately equal to atmospheric pressure and the pressure difference between the inlet chamber and the exhaust chamber is advantageously equal to at least 10 Bar, and is preferably equal to 30 Bar.

The extreme closed position of the inlet piston is advantageously the position in which it reaches at least the edge of the exhaust orifice so as to make all solid granular materials present in the compression chamber flow by gravity.

According to one advantageous embodiment, the granular solid material is also evacuated to the exhaust chamber by the gas at the pressure in the exhaust chamber, present in the balancing chamber through the balancing orifice.

Once step d/has been done, a step e/is done to return the inlet piston and the exhaust piston into their extreme open position and extreme closed position respectively.

The frequency of a transfer cycle from step a/to step e/may be relatively high, for example it may be more than 0.1 Hz. It may be between 0.1 Hz and 10 Hz, for example of the order of one hertz.

The invention also relates to application of the transfer method defined above to feed a biomass gasification reactor. In this application, it is preferable if the device can be fed by a delivery means such as a worm screw, arranged on the upstream side of the inlet hopper.

Thus, the invention as defined discloses a transfer of a granular solid material by a kinetic device with alternating axial movement, with an intermediate chamber that can be used to compress the gas to at least the exhaust pressure, for the inlet and exhaust of the granular solid material, by gravity flow, and that passes alternately in the zones of low pressure and higher pressure.

Transfer of solid material according to the invention is perfectly sealed by the rings and makes partial recycling of the gas used for the transfer possible (recovery of the energy from the compressed gas in the compression chamber).

The transfer device according to the invention is much smaller, has more flexible operation and requires lower energy consumption and lower investment than is possible with transfer methods and processes of solid granular material according to prior art and can reduce pollution downstream from the cycle.

The volume flow rate of the device according to the invention obviously depends on the capacity (sleeve and compression chamber dimensions), the filling ratio and the frequency of the alternating movement of the inlet and exhaust pistons.

The invention aims at an ideal cycle in which energy consumption is no more than the mathematical product of the volume of transferred material and the pressure difference. In particular, the exhaust piston does not generate any work since its movement against pressure is equal to movement at the same driving pressure, and its consumption is theoretically zero.

When optimum operation is required in the design, in other words in which the volume flow rate from the pump supplying the piston performing an inlet and compression function is approximately equal to the volume flow rate of the granular solid material to be transferred, except for the compression ratio. Furthermore, the volume flow rate of the pump supplying the exhaust piston is approximately zero, and a gap can be provided to counter any friction between the piston and the sleeve, since the exhaust piston does not push any granular material. In this sense, it does not create any work and its energy consumption is practically zero, except for friction.

Advantageously, it is possible to continuously detect piston positions for dependability reasons, preferably using sensors with differential transformers fixed firstly to the rods screwed to the pistons, and secondly to the body of the piston feed pump.

BRIEF DESCRIPTION OF THE DRAWINGS

Other advantages and characteristics of the invention will become clear after reading the detailed description given with reference to FIGS. 1A to 1F and 2A and 2B that show the different steps in an operating cycle of a biomass transfer device according to one embodiment, used to feed a gasification reactor.

DETAILED PRESENTATION OF PARTICULAR EMBODIMENTS

Figure 1A:
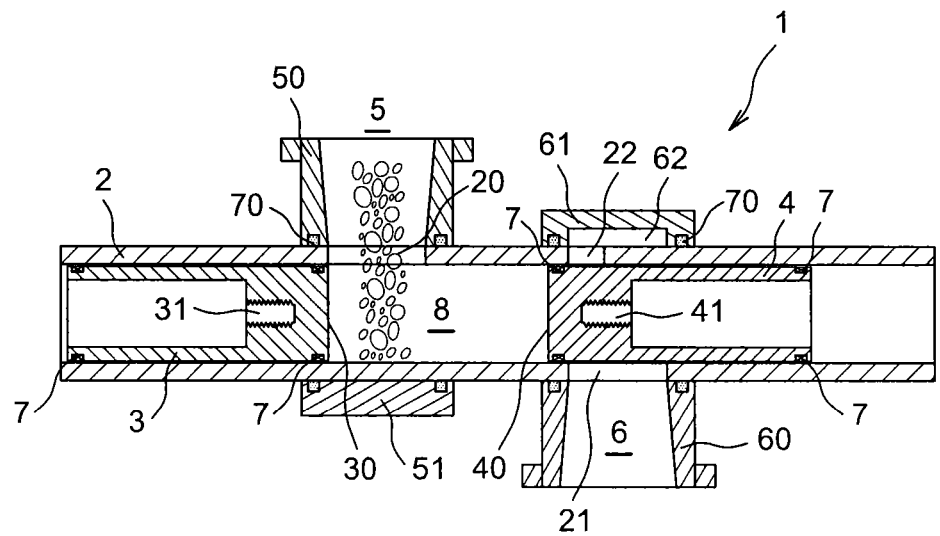
Figure 1B:
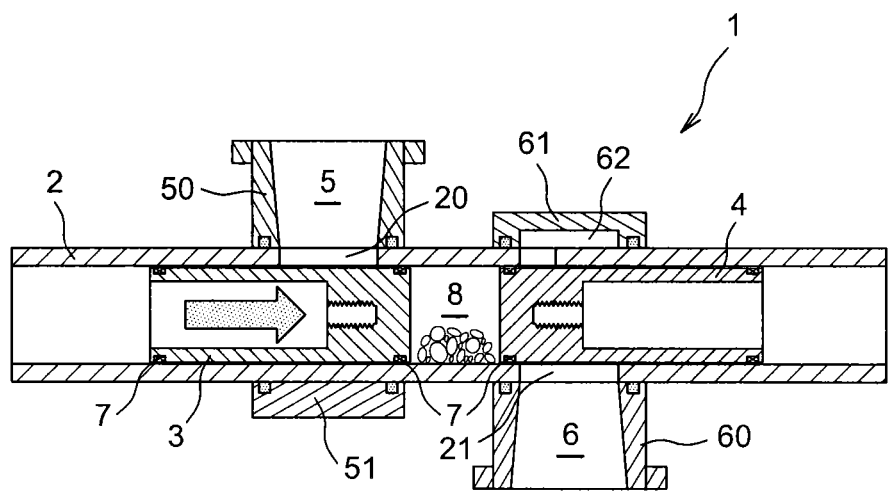

As shown, the transfer device 1 according to the invention is capable of transferring solid material in granular form, such as biomass for which the particles have variable size grading, from an inlet chamber 5 at atmospheric pressure to an exhaust chamber 6 at a pressure of the order of 30 Bar.

This exhaust chamber 6 directly forms a feed chamber to a gasification reactor or is connected to a separate reactor feed system such as a worm screw system.

The device 1 comprises firstly a tubular sleeve 2 through which two orifices 20, 21 are formed, including an inlet orifice 20 in communication with the inlet chamber 5 and the other exhaust orifice 21 is in communication with the exhaust chamber 6. The sleeve 2 also comprises a third orifice called the balancing orifice 22, the function of which will be described later. In the embodiment shown, the inlet orifice 20 and the balancing orifice 22 are diametrically opposite the exhaust orifice 21. Furthermore, the balancing orifice 22 is facing the exhaust orifice 21 and more precisely is adjacent to the edge of the exhaust orifice 21 closest to the inlet. The sleeve 2 may advantageously be made of stainless steel with hard chromium plating on the inside.

There are two sliding pistons 3, 4 on the inside of the tubular sleeve 2, installed top-to-bottom, in other words with their corresponding compression surfaces 30, 40 facing each other. The two pistons 3, 4 are mechanically independent and move along the same direction throughout an operating cycle, in other words along the same axis of sliding as shown in FIGS. 1A to 1F. Identical pistons 3, 4 may advantageously be made of a hard chromium-plated light alloy.

The inlet piston 3 is capable of moving between its extreme open position in which it at least partially exposes the inlet orifice 20 and its extreme closed position in which it closes off the inlet orifice 20 while leaving the exhaust orifice 21 at least partially exposed. In the embodiment shown, the inlet piston completely exposes the inlet orifice in its extreme open position (FIG. 1A) and it reaches the edge of the exhaust orifice in its extreme closed position (FIG. 1D).

An exposed orifice means that fluid communication is set up between the orifice and the inside 8 of the sleeve 2.

The exhaust piston 4 is free to move between its extreme closed position in which it closes off the exhaust orifice 21 while leaving the inlet orifice 20 exposed, and an extreme open position in which it at least partially exposes the exhaust orifice 20. In the embodiment shown, the exhaust piston 4 closes off the exhaust orifice 21 by being in the immediate vicinity of its edge closest to the inlet 20 in its extreme closed position (FIG. 1A) and it completely exposes the exhaust orifice 21 by being in the immediate vicinity of its edge furthest from the inlet 20 in its extreme open position (FIG. 1D).

Rings 7 are provided around the periphery at the end of the pistons, in other words arranged at the periphery of the pistons and close to the corresponding compression surface 30, 40, in order to achieve the axial seal; they are thus in permanent contact with the inside surface of the sleeve 2 when the pistons 3, 4 slide. All rings 7 are preferably identical to each other and of the self-lubricating type. Advantageously, they are metallic rings with bronze such as ferro-bronze, preferably toroidal in shape.

Furthermore, as shown, the pistons 3, 4 are threaded internally at their bottom 31, 41 so that their displacement rod (not shown) will fit into them by screwing.

Therefore the space delimited between the inlet piston 3 and the exhaust piston 4 is a variable volume chamber 8 acting as inlet chamber for gas and also for granular solid material from the inlet chamber 5, as compression chamber for gas up to the exhaust pressure 6 and as exhaust chamber for compressed gas and granular solid material to the exhaust chamber 6. This variable volume chamber 8 is called the compression chamber.

In the embodiment shown, fluid communication between the inlet chamber 5 and the compression chamber 8 when the inlet orifice is exposed is done through an inlet hopper 50. Similarly, communication between the compression chamber 8 and the exhaust chamber 6 is done through an exhaust hopper 60. As shown, each of these hoppers 50, 60 forms a tubing 51, 61 capable of being fitted around the tubular sleeve. Furthermore, the exhaust tubing 61 delimits a fourth chamber 62 on the inside called the balancing chamber, in fluid communication with the balancing orifice 22 when it is fitted around the tubular sleeve 2. For assembly of tubing 51, 61, a seal can be made by means of O-ring type seals 70, and they can be axially blocked along the tubular sleeve 2, preferably by needle screws not shown. The hoppers 50, 60 and tubing 51, 61 are preferably made of stainless steel.

As shown, in order to transfer granular solid material using minimum energy, the device according to the invention 1 is installed in a horizontal configuration, in other words with the tubular sleeve 2 arranged approximately horizontal, the hoppers 5, 6 being arranged approximately vertical with the inlet orifice 20 facing upwards and the exhaust orifice 21 facing downwards. Such a configuration of the device according to the invention 1 enables gravity flow of solid granular material both at the inlet, in other words between the inlet chamber 5 and the compression chamber 8, and at the exhaust, in other words between the compression chamber 8 and the exhaust chamber 6.

The steps in an operating cycle of the device 1 according to the invention will now be described.

Note firstly that the granular solid material to be transferred is symbolised in the form of small circles, and input of energy to pistons is symbolically shown in the form of black arrows while white arrows symbolise possible energy recovery. When the inlet piston 3 is in its extreme open position, the exhaust piston is in its extreme closed position and the solid granular material flows by gravity from the inlet chamber 5 into the compression chamber 8 inside the tubular sleeve 2 (FIG. 1A). The pressure in the compression chamber 8 is then equal to the pressure in the inlet chamber 5, namely approximately equal to atmospheric pressure.

Figure 1C:
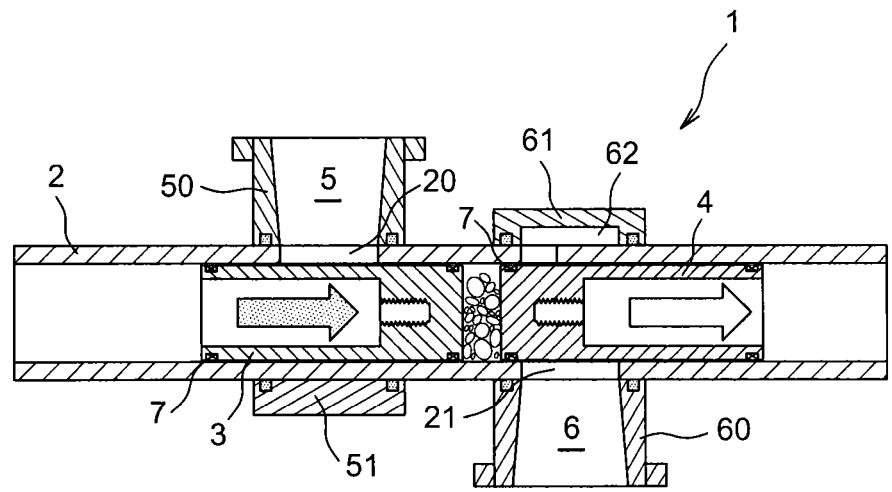
Figure 1D:
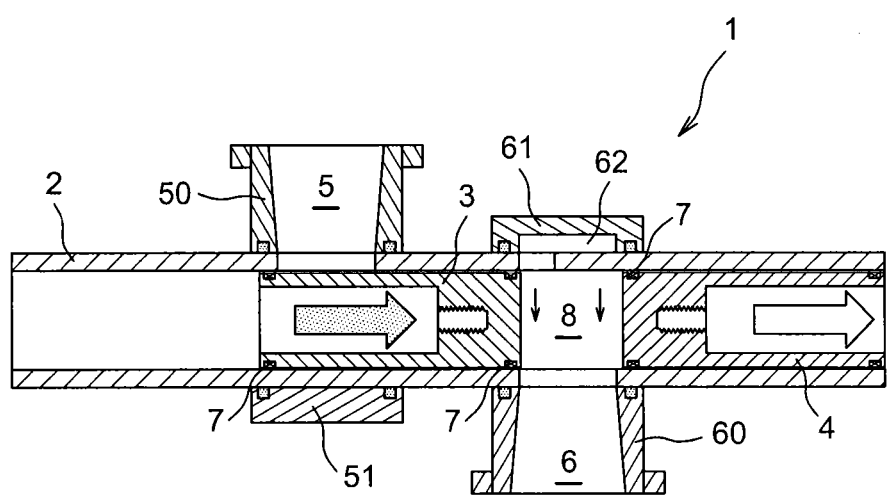

The inlet piston 3 is then moved towards the exhaust piston 4 held in its extreme closed position and therefore firstly closes off the inlet orifice 20 (FIG. 1B) and secondly increases the gas pressure in the chamber 8 until it is approximately equal to the pressure in the exhaust chamber 6, namely of the order of 30 Bar (FIG. 1C). The pressure increase is possible due to the seal at the end of the pistons made by the rings 7. During this pressure increase in the chamber 8 (FIGS. 1B and 1C), the inlet piston 3 also pushes the granular solid material present in the chamber 8 which was spread on the bottom of the sleeve 2 during inlet. In other words, in the intermediate position of the inlet piston in FIG. 1C, the pressure in the chamber 8 is approximately equal to 30 Bar (pressure in the exhaust chamber 6).

The exhaust piston 4 is then released and the inlet piston 3 once again moves until it reaches its extreme closed position and therefore is flush with the edge of the exhaust orifice 21 (FIG. 1D). In this position, all the solid granular material is evacuated through the exhaust hopper 60. This evacuation takes place both by gravity flow and by the volume of gas at the exhaust pressure contained in the balancing chamber 62 previously trapped by closing the exhaust piston 4 and released by the balancing orifice 22 when it is exposed. A vertical downwards arrow in FIG. 1D symbolises the direction of the thrust of additional gas present in the balancing chamber 62 that therefore flushes out solid particles. Thus, this entirely evacuates the granular solid material present in the chamber 8 and advantageously increases the evacuation speed resulting in an increase in the frequency of a complete operating cycle of the device 1. In this case, the exhaust piston 4 may be moved only by the gas pressure inside the chamber 8 and this movement energy may also be entirely recovered as shown symbolically by the white arrow in FIG. 1D. The return phase of the cycle is then started.

Figure 1E:
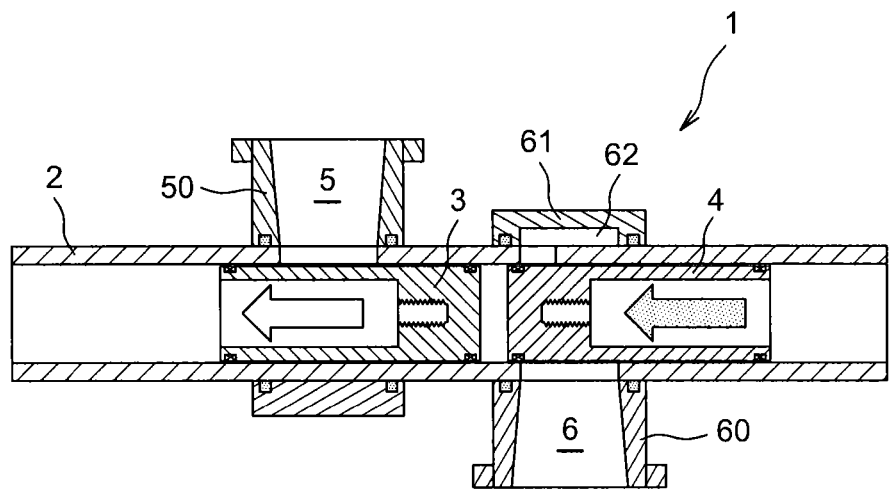

The inlet piston 3 is firstly brought back into an intermediate position moving away from the exhaust orifice and then secondly, the inlet piston 3 is held in this intermediate position and the exhaust piston 4 is brought back into its extreme closed position (FIG. 1E). The return of the exhaust piston traps a gas volume under pressure in the balancing chamber 62 once again and increases the pressure in the chamber 8 that has now been emptied of all solid granular material.

Figure 1F:
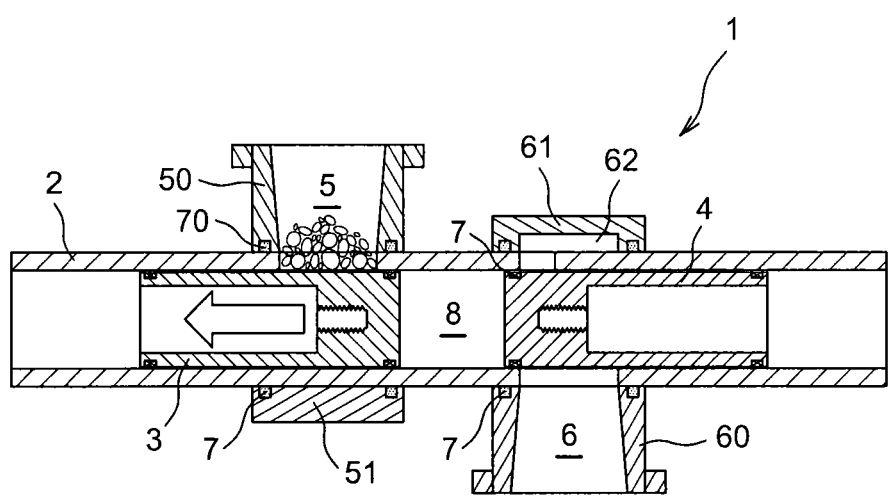

The inlet piston 3 is then released while the exhaust piston 4 is held in its extreme closed position, the gas pressure contained in the chamber 8 then bringing the inlet piston 3 back to its extreme closed position (FIG. 1F).

The volume of the chamber 8 without any material to be transferred into the intermediate return position of the inlet piston 3 and therefore the pressure inside it, is calibrated such that the return of the inlet piston 3 takes place without any added energy as far as its initial position (FIG. 1A) at which a new transfer cycle can begin.

Consequently, there is no net energy input except during compression of the gas in the chamber 8, which corresponds to the transferred solid volume except for friction. All other movements are reversible with the addition of energy along one direction and recovery of energy along the other direction.

Obviously, the device 1 according to the invention could be sized as a function of the target application. In particular, depending on the type of granular solid material to be transferred, the inlet orifice 20 and the exhaust orifice 21 could vary from a few millimeters to a few centimeters, and the angle of the hopper 50, 60 could vary from a few degrees to about 60°, and preferably between 30 and 50°.

In a particularly attractive application for feeding carbonated material to an RFE type gasification reactor or a fluidised bed reactor at 30 Bar pressure, the device 1 according to the invention needs to be sized to have a flow of 35 cc/s of powder from the inlet hopper 50 at atmospheric pressure at temperatures close to ambient conditions. It is arranged such that the quantity of solid biomass material arriving in the inlet hopper 50 is delivered by a worm screw system or equivalent.

To achieve this, the following design is adopted:

identical pistons 3, 4: unit length 136 mm, nominal outside diameter 50 mm with an installation clearance adapted relative to the sleeve 2, total length 136 mm with two piston rings 7 at each of their ends;

tubular sleeve 2: inside diameter 50 mm, total length 456 mm; identical inlet orifice 20 and exhaust orifice 21 made on opposite generating lines with a c/c distance of 124 mm, centred at 166 mm from each end of the sleeve and with a unit length of 50 mm and a unit width of 25 mm; balancing orifice 22 adjacent to the edge of the exhaust orifice 21 and with diameter 10 mm.

travel distance of the inlet piston 3 (between extreme open and extreme closed positions) equal to 124 mm and of the exhaust piston 4 equal to 74 mm.

Thus with the given design, the equivalent capacity of the device 1 is of the order of 100 cc and with an imposed exhaust pressure of 30 Bar, the maximum force applied to each of the two pistons 3, 4 is of the order of 6 kN, and the frequency of an operating cycle (FIG. 1A-FIG. 1F-FIG. 1A) is of the order of one Hertz. Movement is transmitted to the pistons through oil actuators screwed into the bottom of the solid pistons.

Figure 2A:
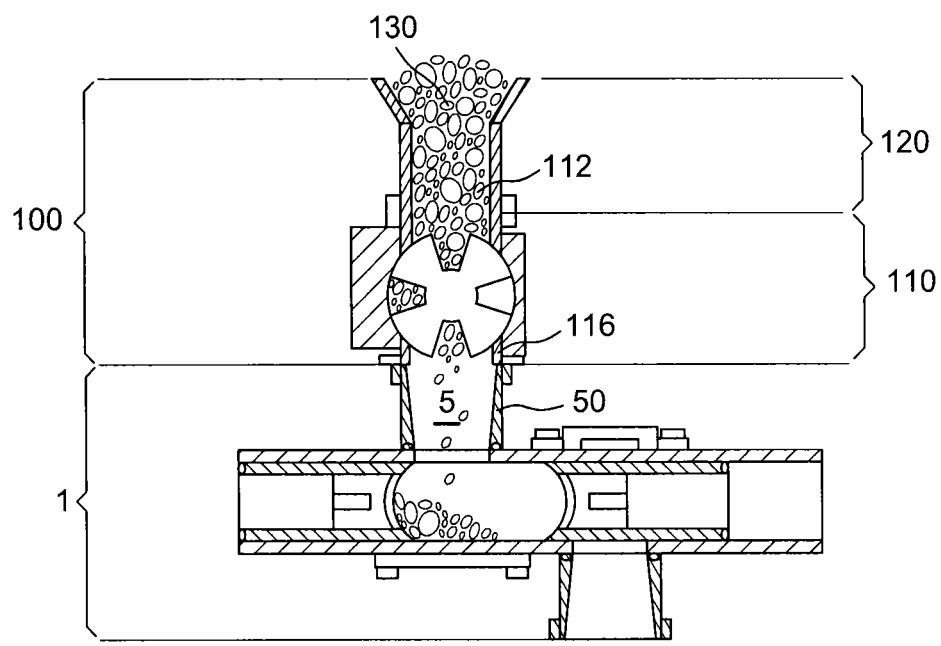

The solid granular material 130 introduced into the device 1 may originate from a feed device 100 on the upstream side of the inlet chamber 5 (FIG. 2A).

Figure 2B:
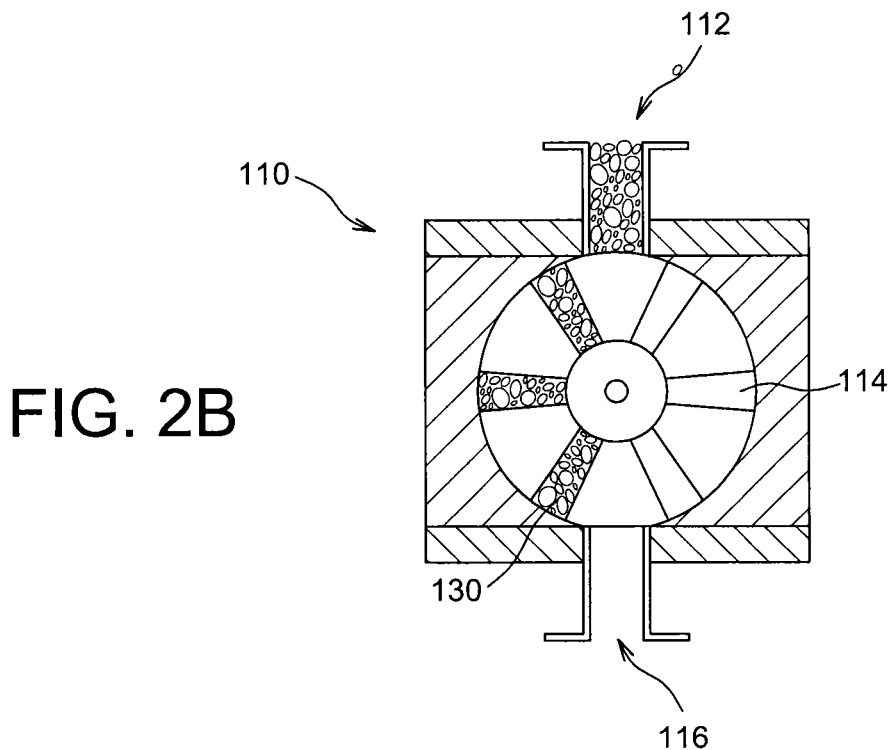

The feed device 100 may be composed of a rotary lock 110, for example a bucket (FIG. 2B). The rotary lock comprises a rotating valve 114 to check the quantity of granular solid 130 entering through an inlet 112, and exiting through an outlet 116 from said lock. The outlet 116 is directly connected to or is installed on the hopper 50.

The rotary lock 110 may be fed for example through a biomass inlet hopper 120 connected to the inlet 112. The feed hopper may be replaced by any other feed device, for example such as a discharger-feeder device.

The biomass preferably flows under gravity between the feed hopper and the inlet chamber 5 of the device 1. All the above elements may be hermetically connected to each other or sealed directly and/or indirectly through channel(s) not shown.

The invention as disclosed above thus defines a device 1 for transferring granular solid material between two chambers 5, 6 at different pressures and that is easy to make, reliable, compact, limits pollution on the downstream side of the transfer cycle, requires relatively low energy consumption and equally low investment.

The reliability of the device 1 according to the invention depends largely on the fact that the pressure increase is progressive which facilitates flow of the solid particles, the flow of solid particles is never hindered because there is no mechanical transmission element installed in the defined variable volume compression chamber 8, and said particles themselves do not hinder any movement. Furthermore, inlet and exhaust pistons may be mechanically actuated independently of each other through rods screwed into the bottom of the pistons and that are an integral part of hydraulic actuators clearly distinct from the tubular sleeve 2. In other words, the hydraulic actuation circuit of pistons 3, 4 is separate from the actual transfer circuit of the solid material. Preferably, high pressure actuators are used to obtain very good efficiency, typically operating at a few hundred to a few thousand Bar.

The design of the device 1 facilitates limiting pollution downstream from the transfer cycle, because due to the actuation circuit of the pistons 3, 4 independent from the transfer circuit, there can be no pollution of the transfer chamber 8 by an element of the actuation circuit such as a hydraulic liquid.

The energy consumption required by a device according to the invention is particularly low because, as mentioned above, the return energies of the inlet 3 and exhaust pistons can be partly recovered.

As energy recovery means, it would be possible to envisage a connecting rod-crank type system with a flywheel or a purely hydraulic solution with gas pressure accumulators. The inventors believe that this solution with gas pressure accumulators is less expensive, more reliable and easier to optimise, for a similar energy efficiency. Thus, it would be possible to envisage gas accumulation under pressure in the accumulators every time that a piston moves with the exhaust pressure, which corresponds to the positions in FIGS. 1C and 1D for the exhaust piston 4 and the positions in FIGS. 1E and 1F for the inlet piston 3.

There are very many applications aimed at by the invention, because very many industries or laboratories are faced with the problem of transferring solid material.

Furthermore, although described exclusively for the transfer of solid material, the pump device according to the invention may also be used for transferring liquid or gas, by increasing their pressure.

The invention claimed is:

1. A piston pump device for transfer between an inlet chamber and an exhaust chamber, the exhaust chamber being pressurized at a greater pressure than pressure in the inlet chamber comprising:
    a tubular sleeve comprising a first inlet orifice in fluid communication with the inlet chamber, and a second exhaust orifice in fluid communication with the exhaust chamber, the inlet orifice and the exhaust orifice being offset longitudinally along the axis of the tubular sleeve, delimiting a third compression chamber between them;
    an inlet piston, sliding in the tubular sleeve between an extreme open position in which it at least partially exposes the inlet orifice in the sleeve and an extreme closed position in which it closes off the inlet orifice while at least partially leaving the exhaust orifice exposed;
    an exhaust piston, sliding in the tubular sleeve between an extreme closed position in which it closes off the exhaust orifice while leaving the inlet orifice exposed, and an extreme open position in which it at least partially exposes the exhaust orifice;
    wherein the inlet piston and the exhaust piston are mechanically independent and are each fitted with sealing rings around their periphery in contact with an internal surface of the sleeve as the pistons slide; and
    wherein the exhaust piston and inlet piston are configured to move in a compression phase such that the exhaust piston is held in its extreme position closing the exhaust orifice until the inlet piston reaches a first intermediate closed position in which it closes off the inlet orifice such that the compression chamber is isolated in a fluid tight manner from the inlet chamber and the exhaust chamber, and the exhaust piston jointly with the inlet piston delimits a volume of the compression chamber, the volume of the compression chamber being reduced in the compression phase by the inlet piston moving towards the exhaust piston such that the gas pressure inside it is at least equal to the gas pressure in the exhaust chamber, and then the exhaust piston is configured to slide in an exhaust phase from its extreme closed position to its open position to allow compressed gas to pass into the exhaust chamber.

2. A piston transfer pump device according to claim 1, wherein the inlet orifice and the exhaust orifice are on opposite sides of the axis of the tubular sleeve.

3. A piston transfer pump device according to claim 1, wherein the tubular sleeve comprises a balancing chamber and a balancing orifice located diametrically opposite the exhaust orifice, the balancing chamber being in fluid communication with the exhaust chamber through the balancing orifice when the exhaust piston is in the extreme open position, and the balancing chamber being closed off from the exhaust chamber when the exhaust piston is in the extreme closed position.

4. A piston transfer pump device according to claim 1, wherein the first intermediate closed position of the inlet piston is such that the pressure in the compression chamber is approximately equal to the pressure in the exhaust chamber.

5. A piston transfer pump device according to claim 1, wherein the exhaust piston slides under action of the gas itself compressed as it passes from the compression chamber into the exhaust chamber.

6. A piston transfer pump device according to claim 5, further comprising a recuperator for recovering energy supplied by the exhaust piston sliding from its extreme closed position to its extreme open position.

7. A piston transfer pump device according to claim 1, wherein the inlet piston is in a second intermediate position when the exhaust piston slides from its open position to its extreme closed position and sliding of the inlet piston from its second intermediate position to its extreme open position is actuated by the compressed gas in the compression chamber.

8. A piston transfer pump device according to claim 7, further comprising a recuperator for recovering energy supplied by the inlet piston sliding from its second intermediate closed position to its extreme open position.

9. A piston transfer pump device according to claim 6, wherein the recuperator for recovering the energy includes a connecting rod-crank system or gas pressure accumulators.

10. A piston transfer pump device according to claim 8, wherein the recuperator for recovering the energy includes a connecting rod-crank system or gas pressure accumulators.

11. A piston transfer pump device according to claim 1, further comprising:
an inlet hopper to create fluid communication between the inlet chamber and the inlet orifice; and
an exhaust hopper to create fluid communication between the exhaust chamber and the exhaust orifice.

12. A piston transfer pump device according to claim 11, wherein the inlet hopper and the exhaust hopper each form a tubing that can be fitted around the tubular sleeve.

13. A piston transfer pump device according to claim 12, wherein the tubing delimits a balancing chamber on the inside, in fluid communication with the balancing orifice when fitted around the tubular sleeve.

14. A piston transfer pump device according to claim 1, wherein the sealing rings are arranged around a periphery of an end of the pistons.

15. A piston transfer pump device according to claim 1, further comprising a feed device comprising a rotary lock connected to the first chamber of the device.

16. A method of transferring solid granular material between two chambers at different pressures using a device according to claim 1, according to which the sleeve is in an approximately horizontal position with the inlet orifice and the exhaust orifice in an upper part and lower part respectively of the sleeve, and comprising:
a) moving the inlet piston into its extreme open position such that solid granular material flows by gravity into the compression chamber and to bring the exhaust piston into its extreme closed position;
b) moving, in the compression phase, the inlet piston into its extreme closed position of the inlet orifice while the exhaust piston is held in its extreme closed position so as to move the granular solid material horizontally and to reduce the volume of the compression chamber to compress the gas present in the compression chamber;
c) when the inlet piston has reached its first intermediate closed position, moving the exhaust piston to its extreme open position until communication is created between the compression chamber and the exhaust orifice; and
d) moving the inlet piston as far as its extreme closed position so as to make granular solid material flow by gravity from the compression chamber through the exhaust orifice.

17. A transfer method according to claim 16, wherein the pressure in the inlet chamber is approximately equal to atmospheric pressure.

18. A transfer method according to claim 16, wherein a pressure difference between the inlet chamber and the exhaust chamber is in a range of 10 Bar to 30 Bar.

19. A transfer method according to claim 16, wherein the extreme closed position of the inlet piston is the position in which it has reached at least an edge of the exhaust orifice so as to make all solid granular materials present in the compression chamber flow by gravity.

20. A transfer method according to claim 16, wherein the granular solid material is also evacuated to the exhaust chamber by the gas at the pressure in the exhaust chamber present in the balancing chamber through the balancing orifice.

21. A transfer method according to claim 16, wherein once d) has been executed, further comprising e) returning the inlet piston and the exhaust piston into their extreme open and extreme closed positions respectively.

22. A transfer method according to claim 21, wherein frequency of a transfer cycle from a) to e) is between 0.1 Hz and 10 Hz.

23. A transfer method according to claim 16, wherein a pressure difference between the inlet chamber and the exhaust chamber is in a range of 10 Bar to 30 Bar.

24. A transfer method according to claim 16, wherein the device feeds a biomass gasification reactor.

25. A transfer method according to claim 24, wherein the device is fed by a worm screw, arranged on an upstream side of the inlet hopper.

* * * * *